United States Patent [19]

Gendrault et al.

[11] Patent Number: 5,217,344
[45] Date of Patent: Jun. 8, 1993

[54] LARGE, HIGH-CAPACITY AUTOMATED TRANSPORTABLE CONSTRUCTION BOOM FOR USE IN OPEN AREAS

[75] Inventors: Michel Gendrault, La Clayette; Charles A. Roch, Sceaux, both of France

[73] Assignees: Potain (Societe Anonyme), Ecully; Compagnie Generale de Batiment et de Construction CBC (Societe Anonyme), Puteaux, both of France

[21] Appl. No.: 604,495

[22] Filed: Oct. 29, 1990

[30] Foreign Application Priority Data

Oct. 27, 1989 [FR] France .................... 89 14613

[51] Int. Cl.⁵ .................................... B66C 23/00
[52] U.S. Cl. .................................... 414/729; 212/184; 212/188; 212/195; 280/415.1; 280/404; 414/680
[58] Field of Search ............... 414/680, 719, 722, 729; 901/15, 18, 27, 28, 48, 45, 49; 212/182, 184, 187, 188, 195, 232, 245; 280/415.1, 418.1, 404

[56] References Cited

U.S. PATENT DOCUMENTS

| | | | |
|---|---|---|---|
| 3,801,132 | 4/1974 | Haynie et al. | 280/404 |
| 3,850,307 | 11/1974 | Motoda | 414/680 X |
| 4,073,201 | 2/1978 | Taylor et al. | 901/29 X |
| 4,229,136 | 10/1980 | Panissidi | 901/29 X |
| 4,818,174 | 4/1989 | Arpiarian | 901/45 X |
| 4,976,582 | 12/1990 | Clavel | 901/28 X |

FOREIGN PATENT DOCUMENTS

| | | | |
|---|---|---|---|
| 2139936 | 2/1973 | Fed. Rep. of Germany | 414/680 |
| 157737 | 7/1987 | Japan | 901/28 |
| 797703 | 1/1981 | U.S.S.R. | 414/680 |
| 1222538 | 4/1986 | U.S.S.R. | 901/27 |
| 775128 | 5/1957 | United Kingdom | 212/225 |

Primary Examiner—Michael S. Huppert
Assistant Examiner—Donald W. Underwood
Attorney, Agent, or Firm—Browdy and Neimark

[57] ABSTRACT

A manipulator designed to handle loads on construction or public works sites is shown and described. A motorized carrier (1) has an orientable pole (9) and an arm that can be folded and unfolded (16) hinged to the top of the pole and made of several elements (17, 18, 19) hinged together. The end of arm (16) is connected by a motorized link (29) to a telescopic and orientable motorized compensator arm (2) having at least one degree of redundant clearance and endowed with a stress-detecting active-compliance gripper carrier (36) supporting a gripper (3). Adjustment and control mechanisms are provided for the motorization of carrier (1), compensator arm (2) and link (29), while other means supply energy to and adjust and control gripper (3).

9 Claims, 13 Drawing Sheets

FIG_5

FIG_9

LARGE, HIGH-CAPACITY AUTOMATED TRANSPORTABLE CONSTRUCTION BOOM FOR USE IN OPEN AREAS

BACKGROUND OF THE INVENTION

1. Field of the Invention

This invention pertains to a large, high-capacity automated transportable construction boom for use in open areas, i.e., outside. This invention's applications are found primarily in various handling and site operations necessary in the realization of construction and public works structures, as well as any other similar activities in which it can be considered as an evolution of traditional lifting mechanisms such as cranes.

The application of robotics to the field of handling heavy loads, primarily loads in excess of one ton such as those presently found on sites, are still limited at the present time. The use of conventional booms does not allow precise positioning of heavy loads because of considerable distortion in the structure on the one hand, and the differences in distortion between the loaded and empty states.

2. The Prior Art

In known embodiments such as those described in French U.S. Pat. No. 2,383,758, the problem of the precise positioning of handled loads is solved by using a group of booms wherein each boom performs different functions, the functions of said booms being combined to perform the desired task. In this way, said set can be composed, for example, of a first manipulator performing the lifting work and the function of vertically supporting the load, while a second manipulator moves the load horizontally and guides it. Said embodiments require an infrastructure that limits their application to repetitive tasks in the manufacturing field.

For building construction and public works sites, where the tasks evolve as the work progresses, the use of a group of manipulators of this type cannot be envisioned, also because of the size of the structures and the difficulty of installing a temporary structure over such works.

BRIEF SUMMARY OF THE INVENTION

This invention provides a solution for the precise automated positioning of heavy loads in open and non-structured areas.

For this purpose, the invention provides a large, high-capacity automated transportable construction boom composed of a combination of the following:

a carrier having a slender, elastically-deformable motorized structure composed essentially of a pole that can be oriented around a substantially vertical axis and an arm hinged to the top of the pole around a substantially horizontal axis and made of several elements hinged together around axes parallel to the preceding one, said arm able to fold and unfold in a vertical plane running through the rotation axis of the pole;

a telescopic, orientable motorized compensator arm having a low-inertia structure relative to the arm of the carrier, having at least one degree of redundant clearance and endowed with a stress-detecting active-compliance gripper carrier;

a motorized link of the compensator arm with the end of the carrier arm;

means to control and adjust the motorization of the carrier, the compensator arm and the link of the compensator arm with the carrier;

means to supply energy to and to adjust/control a gripper supported by the gripper carrier.

According to a preferred embodiment of the invention, the carrier comprises a fixed or rolling underframe providing the link with the ground, overmounted by a motorized orientation device and a rotating underframe endowed with a base pole that can accommodate additional pole elements to form an extendable pole on which a slide composed of a telescopable cage surrounding the pole and a support for a rotating compensation ballast placed on the back of the carrier can move vertically, said slide supporting the horizontal hinge axis of the arm in its rear part.

The arm of the carrier is advantageously composed of three elements, with a primary arm whose rear part is portico-shaped, hinging on either side of the slide, a secondary arm hinged to the front end of the primary arm and a tertiary arm hinged to the front end of the secondary arm and supporting the motorized link of the compensator arm at its front end. According to a particular embodiment, the motorized link between the compensator arm and the end of the arm of the carrier is a cardan joint composed of a first motorized axis parallel to the horizontal hinge axis of the arm of the carrier allowing the angular spring movement of the compensator arm in a substantially vertical plane containing the rotation axis of the pole and a second motorized axis perpendicular to the first allowing the angular spring movement of the compensator arm in a substantially vertical plane perpendicular to the preceding one.

According to another characteristic, the compensator arm comprises a substantially vertical telescopic element whose upper fixed part is connected to the front end of the latter element of the arm of the carrier by the motorized link and whose lower sliding part guides and holds, through the intermediary of a cardan, the gripper carrier controlled by three double-action jacks arranged regularly in a cone at 120° intervals, connecting said gripper carrier to the periphery of the fixed part of the telescopic element by universal joints or pivots.

According to an additional characteristic, the gripper carrier with which the compensator arm is endowed is composed of an upper plate accommodating on its upper surface the universal joints or pivots taking up the three double-action jacks and a lower plate accommodating on its lower surface a motorized mechanism to orient the gripper, said plates being substantially coaxial and interconnected by a closed symmetric lattice structure made up of six rocker bars of adjustable length, with stress sensor, said rocker bars being connected to the plates by universal joints or pivots. If applicable, said rocker bars each comprise a double-action jack, controlled independently of the three aforementioned double-action jacks that control the gripper carrier.

In any event, the invention will be more clearly understood through the description below, in reference to the accompanying schematic drawing provided as a non-restrictive example and showing an embodiment of said large, high-capacity automated transportable construction boom for use in open areas.

DETAILED DESCRIPTION OF THE PREFERRED EMBODIMENT

Figure 1:
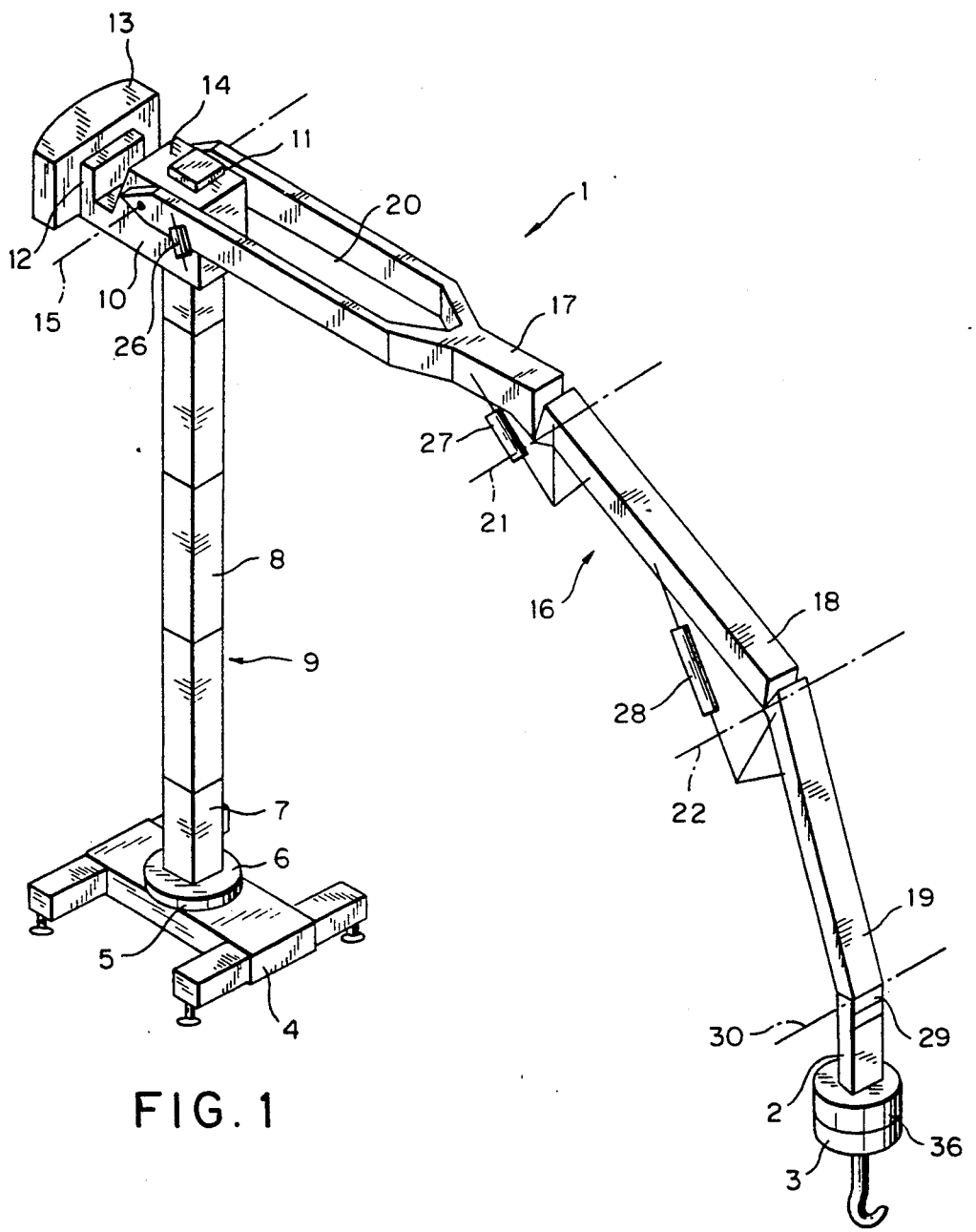
FIG. 1 is a schematic axonometric perspective view of a automated transportable construction boom according to the invention.

The master/slave manipulator shown in FIG. 1 essentially comprises a large carrier 1 with slender, elastically- deformable motorized structure and a motorized compensator arm 2, with low-inertia structure, supporting and supplying with energy a load gripper or a tool carrier 3, shown here as a hook as a purely illustrative example.

Figure 2:
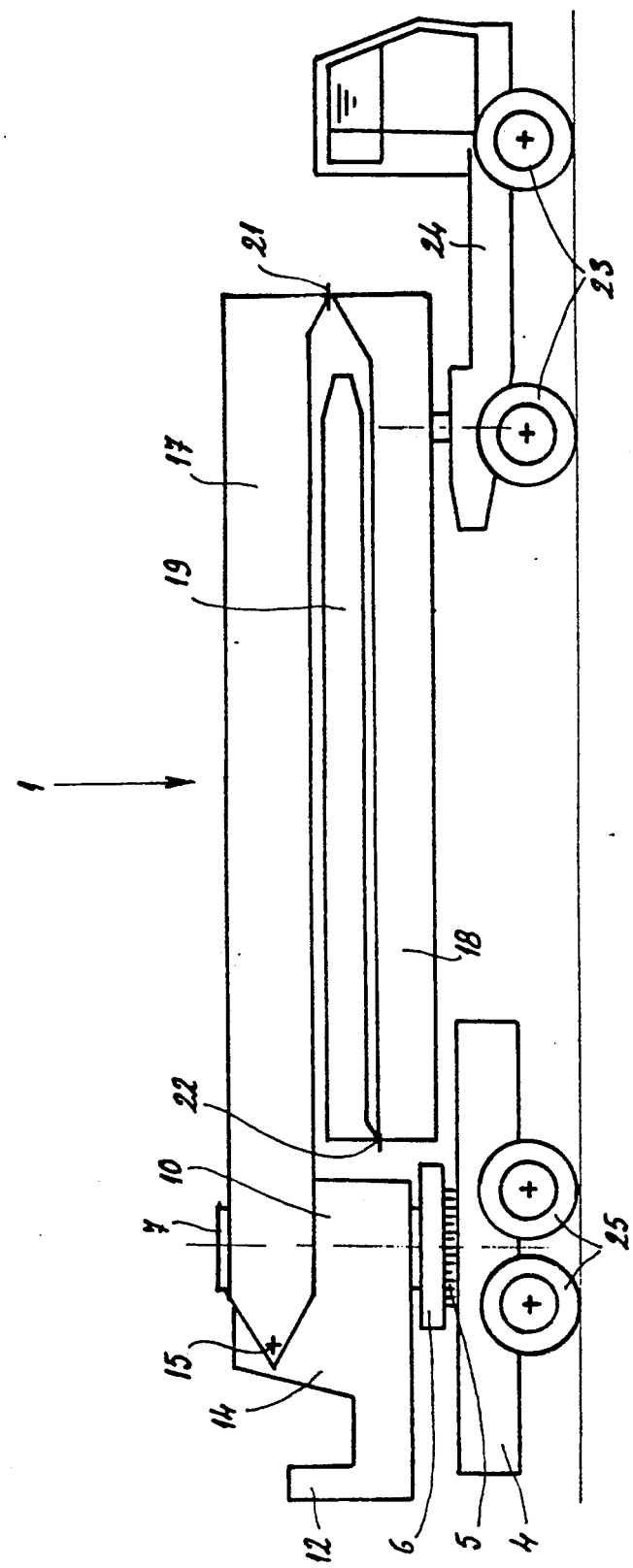
FIG. 2 shows the carrier of the automated transportable construction boom in position completely folded for transport.
Figure 3:
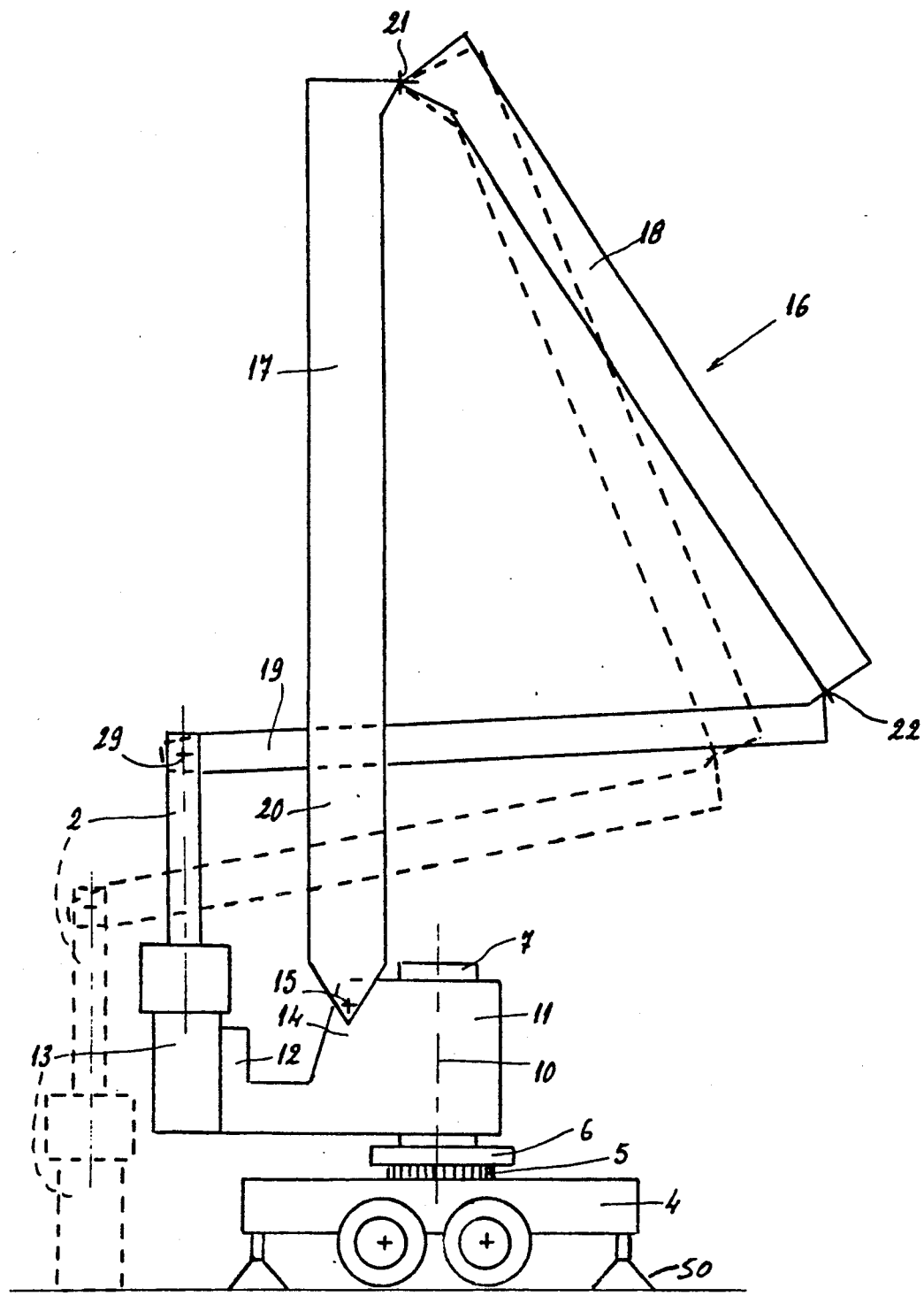
FIG. 3 shows the configuration of the automated transportable construction boom during the positioning of a ballast rotating on the slide.

As shown in FIG. 3, carrier 1 comprises a fixed or rolling underframe 4 with wheels 25 and outriggers 50 to support wheels 25 and the ground thereby ensuring the connection of the carrier on which the boom is installed with the ground. Underframe 4 is overmounted by a motorized orientation device 5 supporting a rotating underframe 6 equipped with a base pole 7. Base pole 7 can accommodate additional pole elements 8 to form an extendable pole 9 on which a slide 10 can move vertically, said slide being composed of a telescopable cage 11 surrounding pole 9 and a support 12 for a rotating compensation ballast 13 placed at the rear of carrier 1. On either side of its rear part 14, slide 10 holds a horizontal axis 15 serving to hinge an arm 16 that can be folded and unfolded, made of three elements hinged together, respectively designated as primary arm 17, secondary arm 18 and tertiary arm 19. Rear part 20 of primary arm 17 is portico-shaped to hinge symmetrically on either side of slide 10 around a horizontal axis 15. Respective hinge axes 21, 22 of the ends opposite primary 17, secondary 18 and tertiary 19 arms are parallel to horizontal axis 15 and are arranged so that, in transport position shown in FIG. 2, arm 16 is entirely folded up in a spiral; elements 17, 18, 19 which compose arm 16 in this case are in position substantially parallel to the ground, embodied in a "semi-trailer" version by wheels 23 of a towing vehicle 24 and by the wheels 25 of a trailer made from underframe 4 of carrier 1 of the boom itself.

The motorization of carrier 1 is provided by an energy production station, a geared motor to orient the rotating part, a telescoping device for the slide 10 along pole 9 (not shown) and double-action jacks 26, 27, 28 hinging arms 17, 18, 19 which raise and distribute loads, shown schematically. The jack(s) ensure the pivoting of primary arm 17 with respect to slide 10 around axis 15. The jack(s) ensure the pivoting of secondary arm 18 with respect to primary arm 17 around axis 21. Jack(s) 28 ensure the pivoting of tertiary arm 19 with respect to secondary arm 18 around axis 22.

Figure 10:
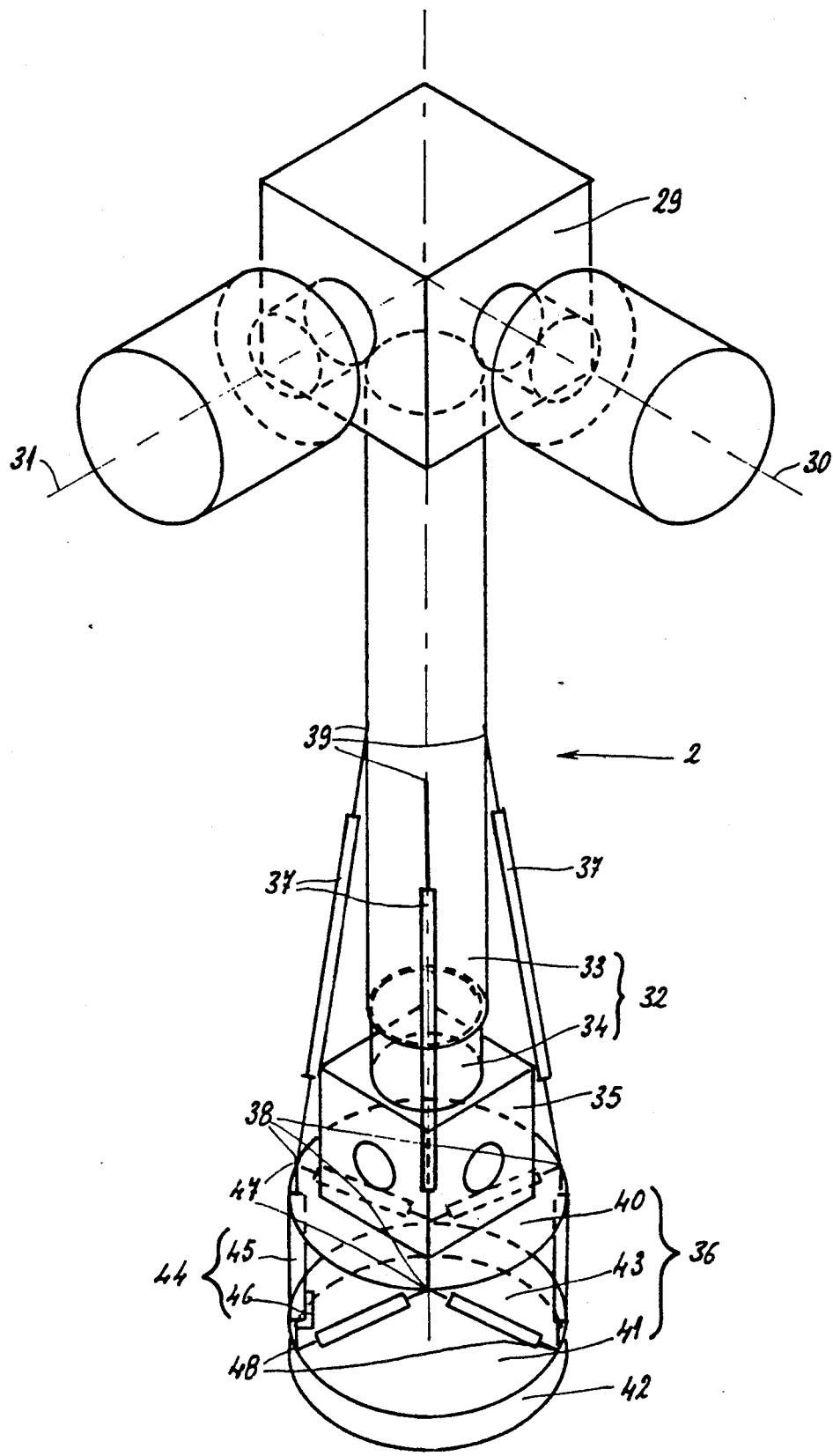
FIG. 10 is a schematic axonometric perspective view of the compensator arm alone.
Figure 11:
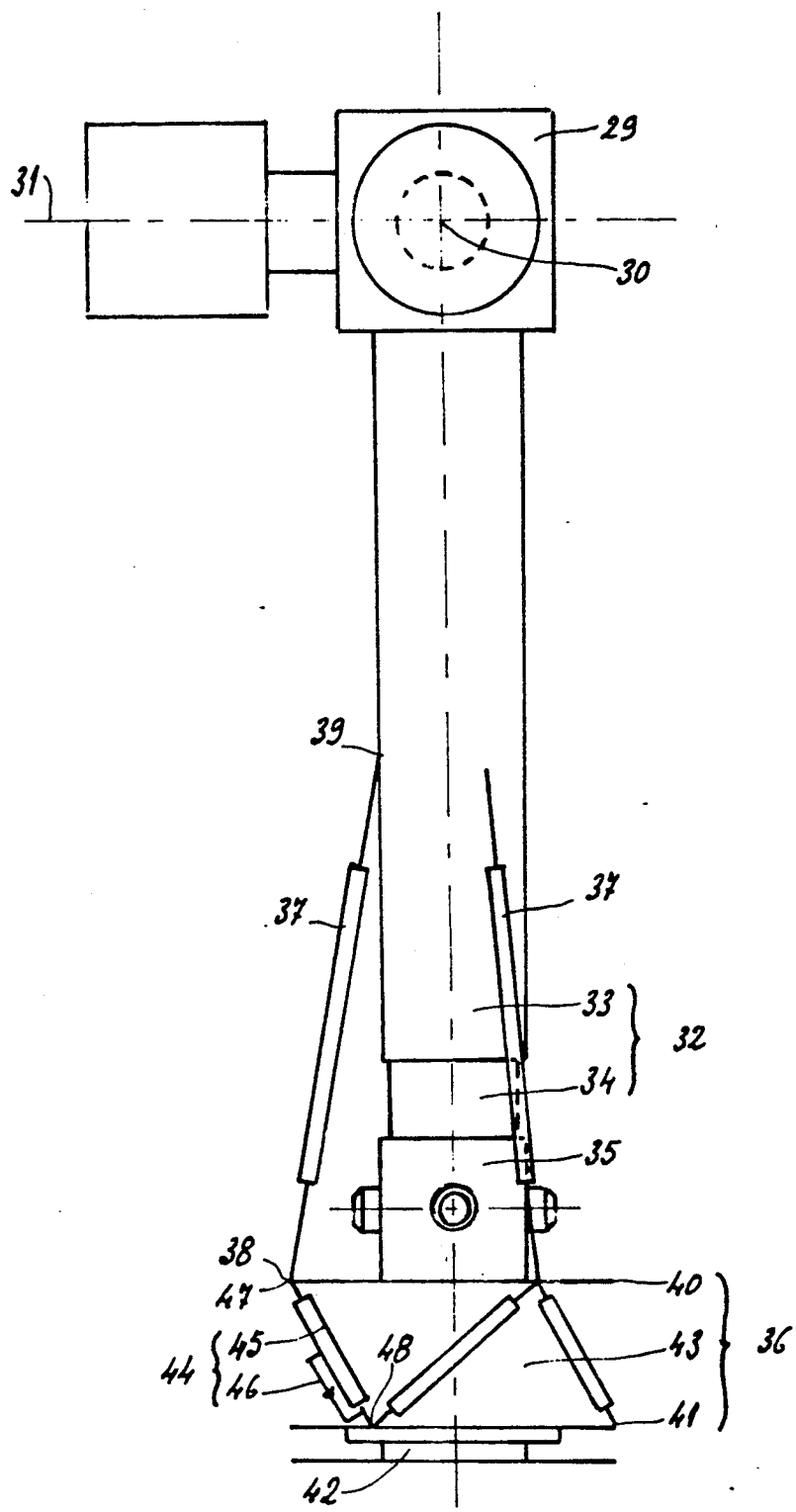
FIG. 11 is an elevation view of the compensator arm.
Figure 12:
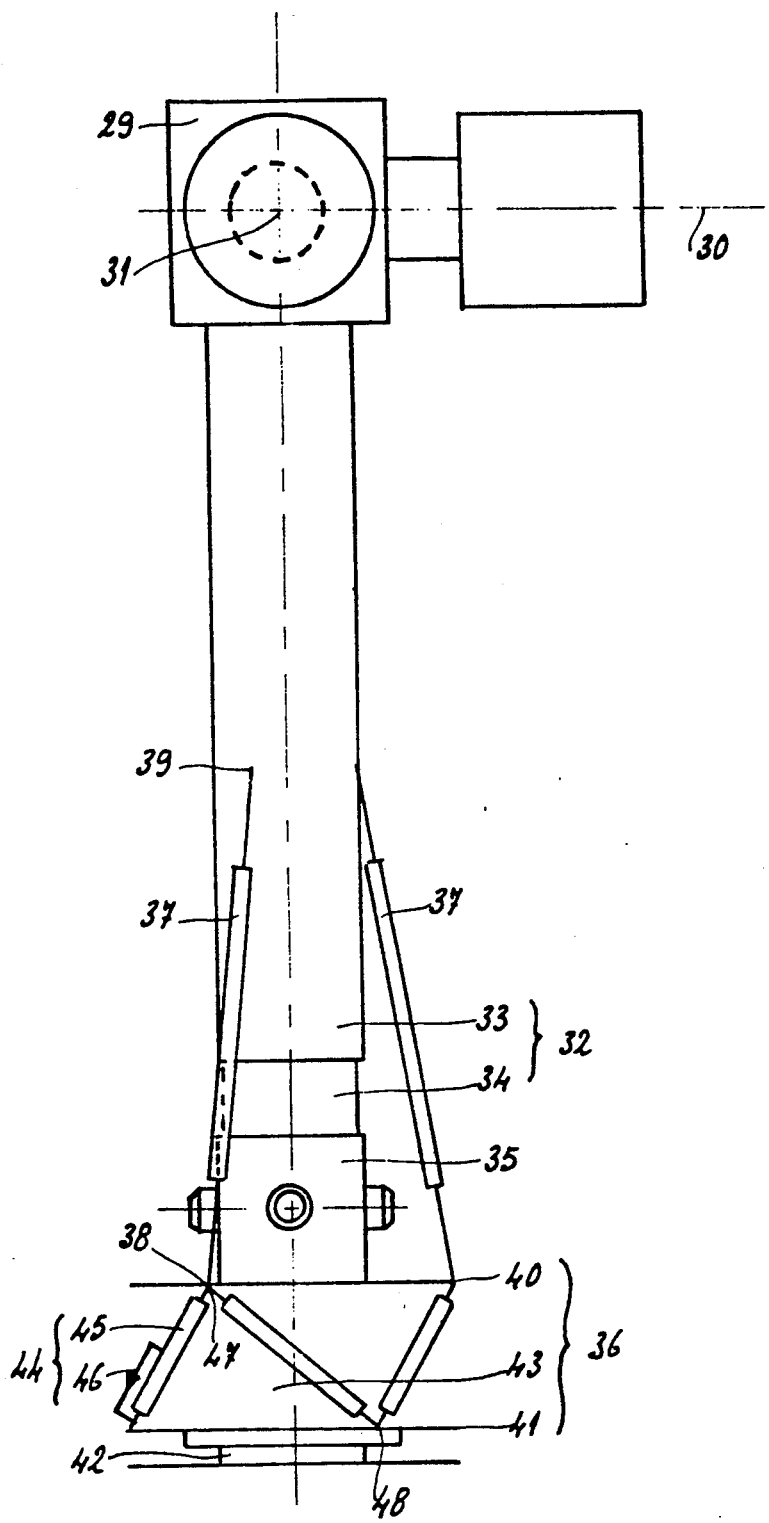
FIG. 12 is a lateral view of the compensator arm.

Compensator arm 2 shown schematically in FIGS. 10 to 12 comprises a motorized cardan 29 link with the front end of tertiary arm 19 of carrier 1. Cardan 29 link is composed of a first motorized axis 30 parallel to horizontal hinge axis 15 of arm 16 on slide 10 ensuring the angular spring movement of compensator arm 2 in a substantially vertical plane containing the rotation axis of pole 9, and a second motorized axis 31 perpendicular and preferably concurrent with the first motorized axis 30 ensuring the angular spring movement of compensator arm 2 in a substantially vertical plane perpendicular to the preceding one. Compensator arm 2 also comprises a substantially vertical telescopic element 32 whose upper part 33 is connected in a fixed manner to the motorized cardan 29 link and whose lower sliding part 34 guides and holds, through the intermediary of a cardan 35, a gripper carrier 36 whose positioning is controlled by three double-action jacks 37 positioned regularly in a cone at 120° intervals, which connect gripper carrier 36 to the periphery of fixed part 33 of telescopic element 32 through universal joints or pivots 38, 39. Gripper carrier 36 is composed of an upper plate 40 accommodating on its upper surface universal joints or pivots 38 taking up the three double-action jacks 37 and a lower plate 41 accommodating on its lower surface a motorized orientation device 42 of gripper 3; the two substantially coaxial plates 40, 41 are interconnected by a closed lattice structure 43, which is symmetrical and composed of six rocker bars 44 of adjustable length, each comprising a double-action jack 45 with stress sensor 46, controlled independently of the three jacks 37, rocker bars 44 being connected to plates 40, 41 by universal joints or pivots 47, 48.

The boom further comprises means to adjust and control the motorization of carrier 1 for the following of trajectories and the absolute positioning of the gripper or the load, as well as the motorization of compensator arm 2 for the fine and relative positioning of the gripper or the load with respect to the assigned object.

In this embodiment, carrier 1 has three degrees of positioning clearance, while compensator arm 2 has, in addition to three degrees of orientation clearance, three redundant degrees of positioning clearance for the fine positioning of the gripper or the load and a six-component stress-detecting active-compliance gripper carrier 36 for final relative positioning. The operation of the boom according to the invention follows the above description. After the initial and final location of the gripping center of the load in the absolute site point of reference for a given handling cycle, large-amplitude movements are performed in an unobstructed manner in automatic programmed mode or by instruction through the use of activators for carrier 1. During large-amplitude movements, compensator arm 2 remains in substantially vertical position through the coupling of the motorization of cardan link 29 with the motorization of jacks 26, 27, 28 for folding or unfolding arms 17, 18, 19. When the gripper or load reaches the final position of the gripping center within the tolerances inherent in the system, the activators of compensator arm 2 take over for the activators of carrier 1 to fine-position the load or the gripper. For approach maneuvers, the compensator arm 2 activators ensure, through the intermediary of stress sensors 46 of gripper carrier 36, the cancellation of horizontal stress and contact moment up to the position in which the load is gripped or deposited. During the progressive transfer of the load from the ground to the boom or vice versa, the carrier 1 activators ensure the progressive correction of the distortion of the structure of the boom depending on its load state, while at the same time, the compensator arm 2 activators ensure that horizontal stress and contact moment are regulated to a nil value through the intermediary of gripper carrier 36 stress sensors 46.

In a variation of operation, compensator arm 2 activator control progressively corrects the distortion of the structure of carrier 1 according to its loaded state and adjusts the horizontal stress and contact moment to a nil value, simultaneously.

As shown in FIG. 2, the boom is designed to be pulled from one site to another; in the "semi-trailer" version shown here, the main parcel carried by the trailer made up of underframe 4 of the boom is composed of motorized orientation device 5, rotating underframe 6 equipped with base pole 7, slide 10 and arm 16 fully folded up. The other components such as ballast 13, the additional pole elements 8, compensator arm 2 and gripper or tool carrier 3 are transported separately in this case.

When it arrives on site, the boom is positioned at the planned installation area using telescopic or unfoldable arms carried by underframe 4 and endowed at their ends either with support jacks in the stationary version, or moving rollers or bogies in versions moving by rail. The main parcel is unfolded and the boom is then equipped with the compensator arm 2.

As shown in FIG. 3, the boom is designed to allow self-ballasting of carrier 1. Because slide 10 is mounted on base pole 7 of rotating underframe 6 in its lowest position and primary arm 17 is raised in its extreme position, for example, substantially vertical, the boom will grasp ballast 13 placed behind carrier 1 through the intermediary of its arm 16 endowed with compensator arm 2 or otherwise, designed so that tertiary arm 19 and, if applicable, compensator arm 2 can pass through the legs of portico 20 that forms the rear part of primary arm 17 and position it on support 12 of slide 10.

Depending on the progress of the work, the boom can adopt several working configurations by positioning additional pole elements 8.

FIGS. 5 to 9 show the boom in different working positions for configurations corresponding to zero, one, two, three or four additional pole 8 elements.

Figure 4:
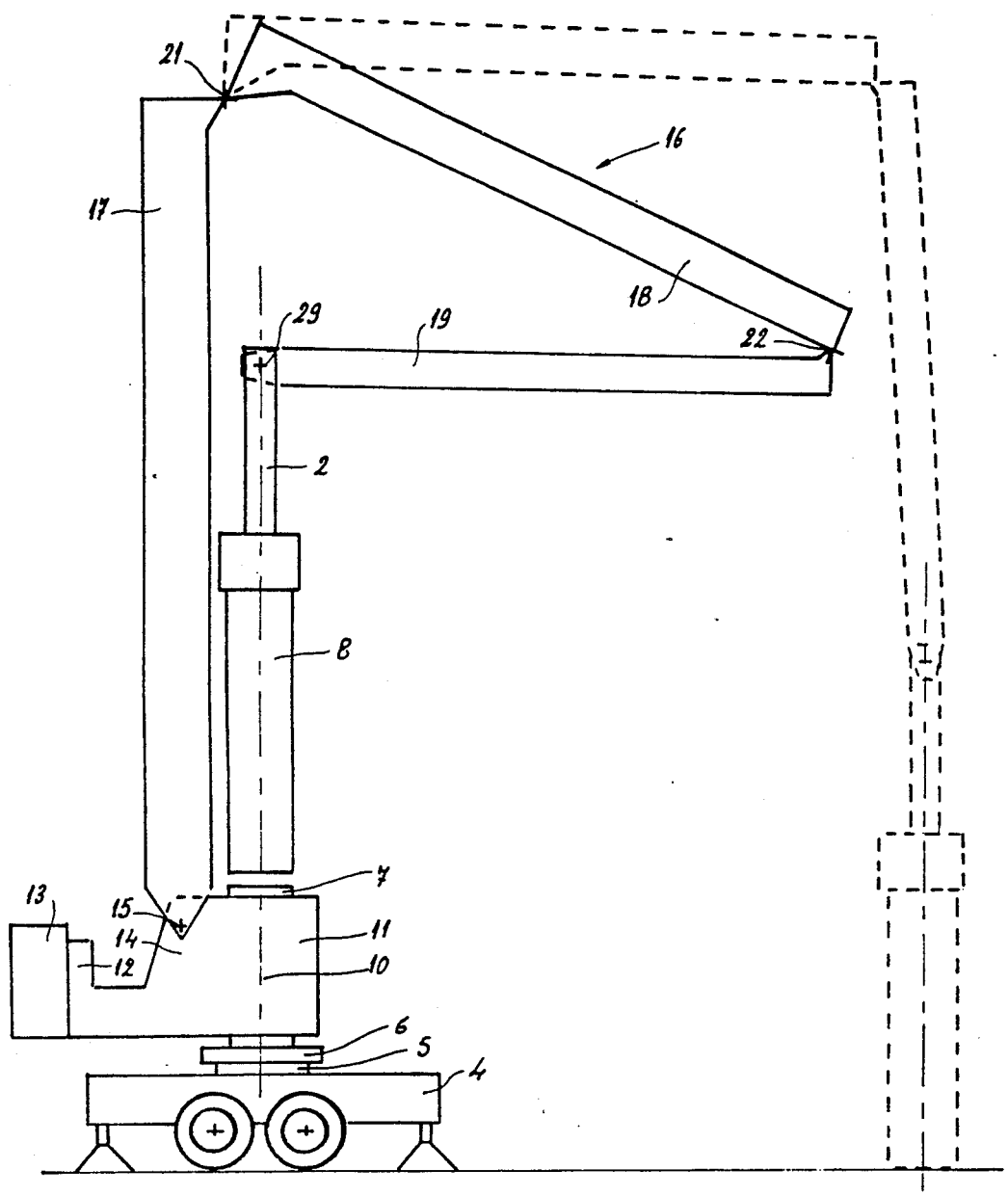
FIG. 4 shows the configuration of the automated transportable construction boom during the positioning of an additional pole element.
Figure 5:
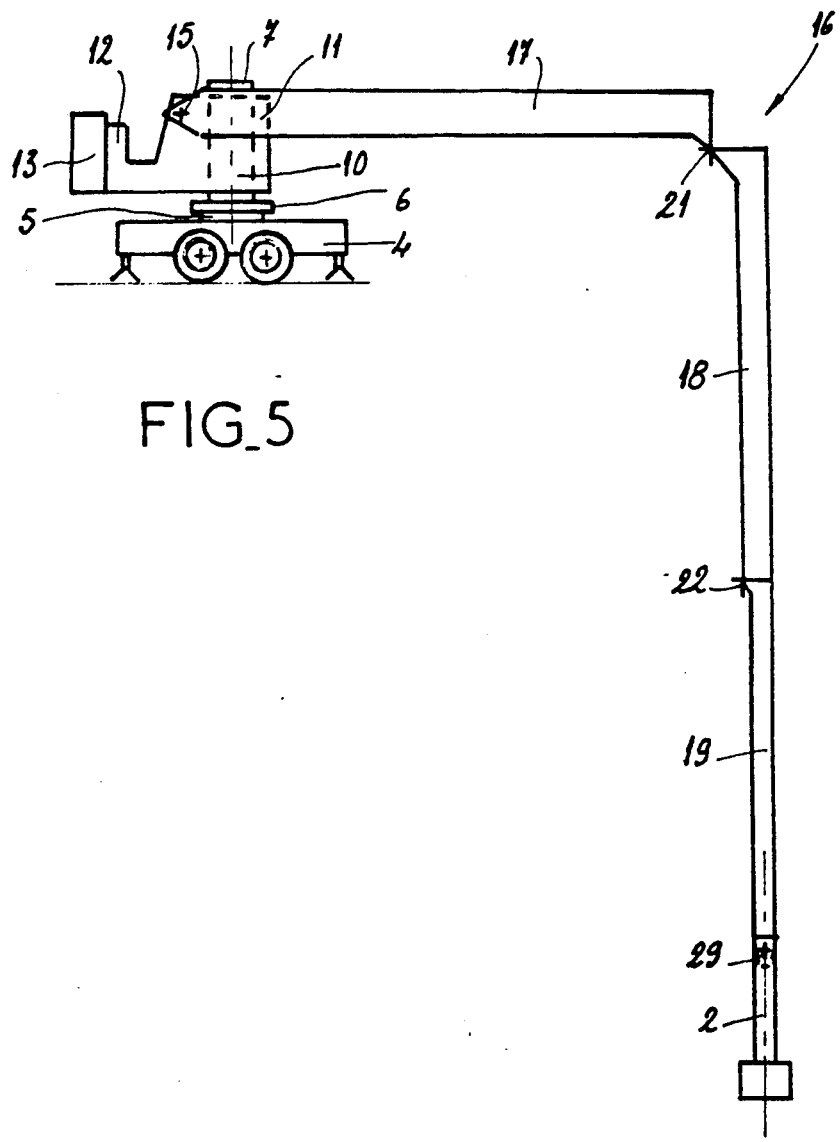
FIG. 5 shows the automated transportable construction boom in operating position in its lowest configuration, with no additional pole elements.
Figure 6:
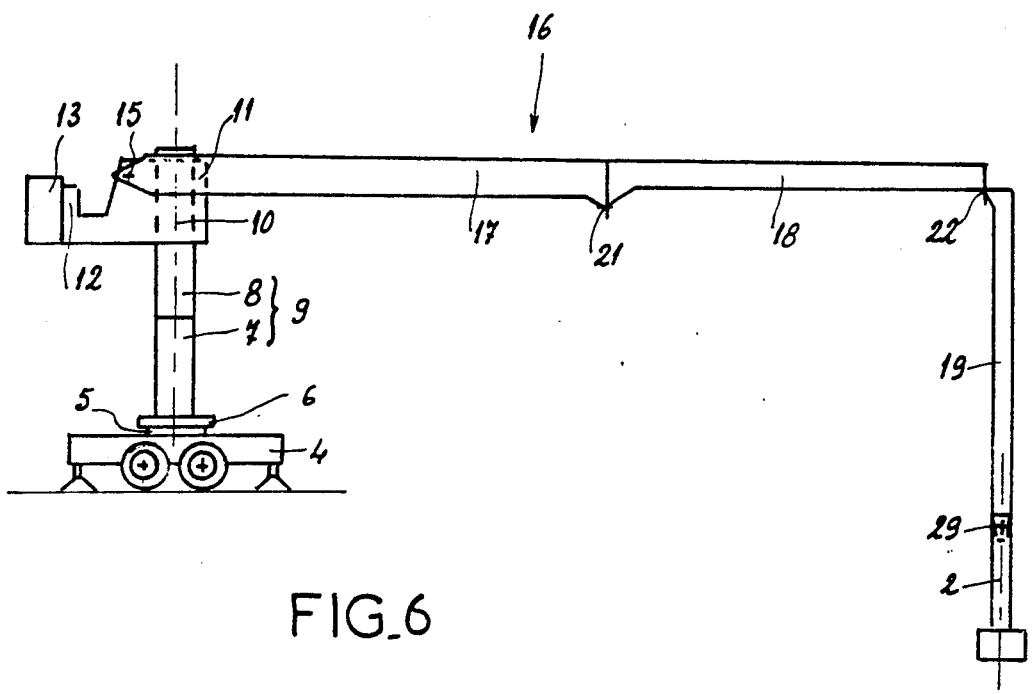
FIGS. 6 to 9 show the automated transportable construction boom in different operating positions for configurations corresponding to one, two, three or four additional pole elements.
Figure 7:
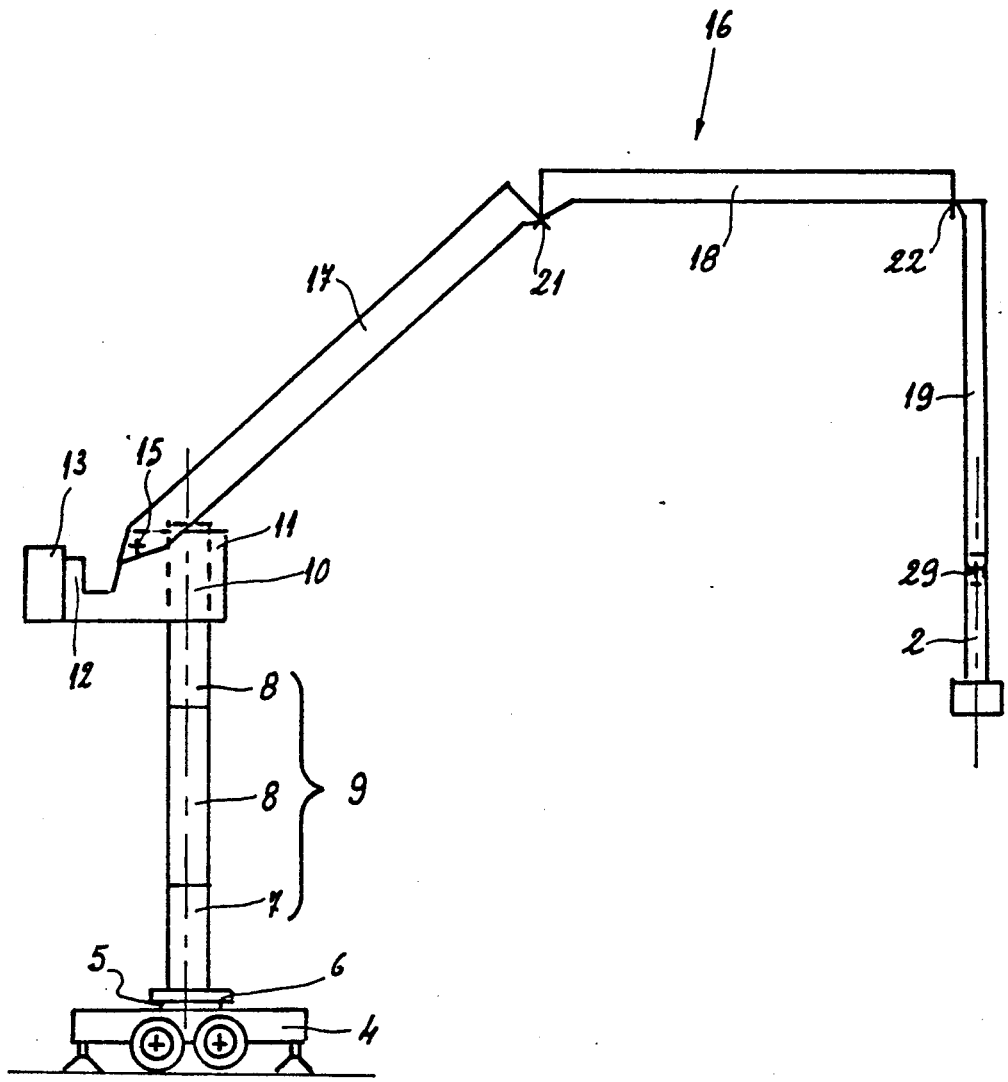
Figure 8:
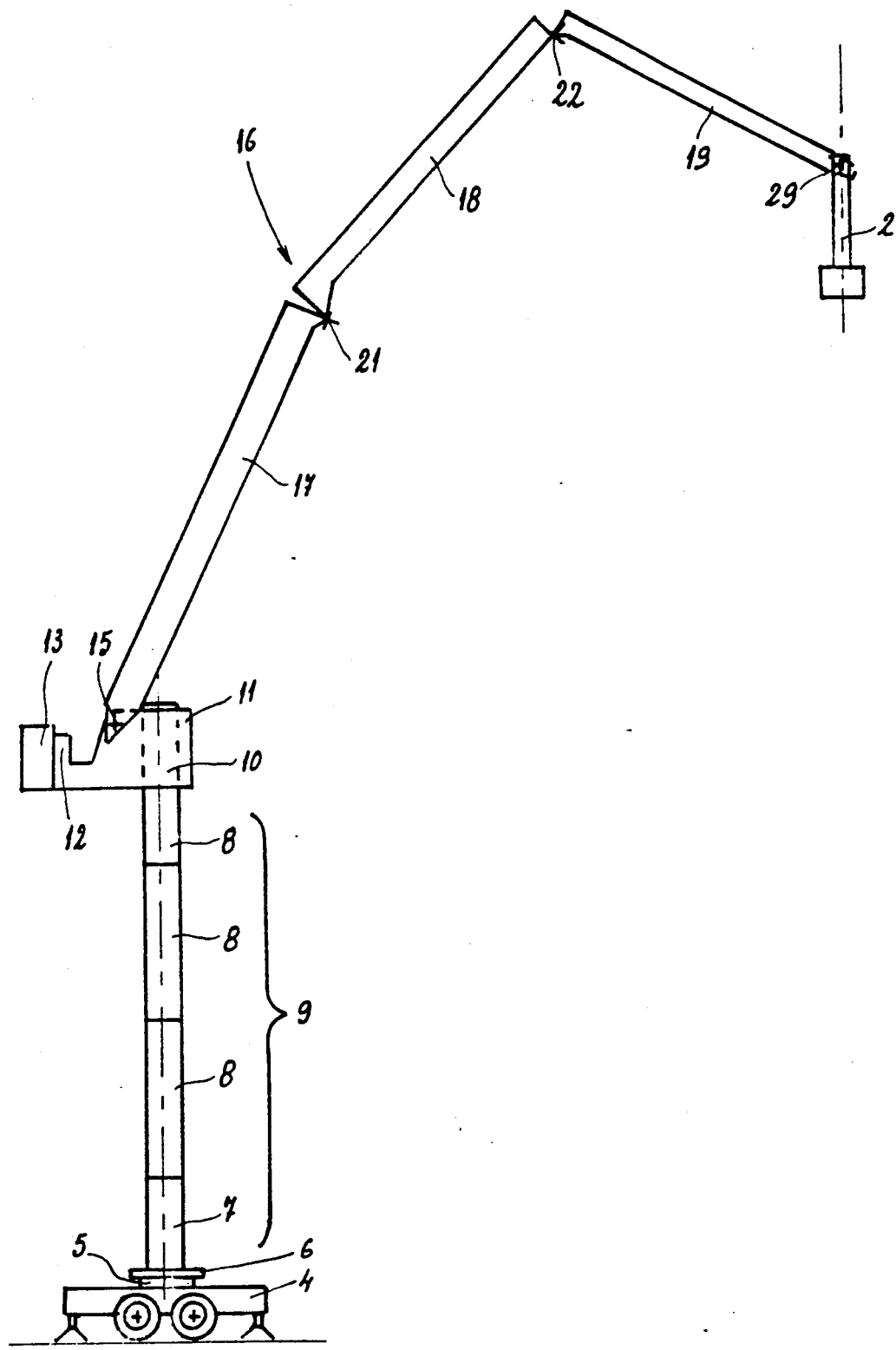
Figure 9:
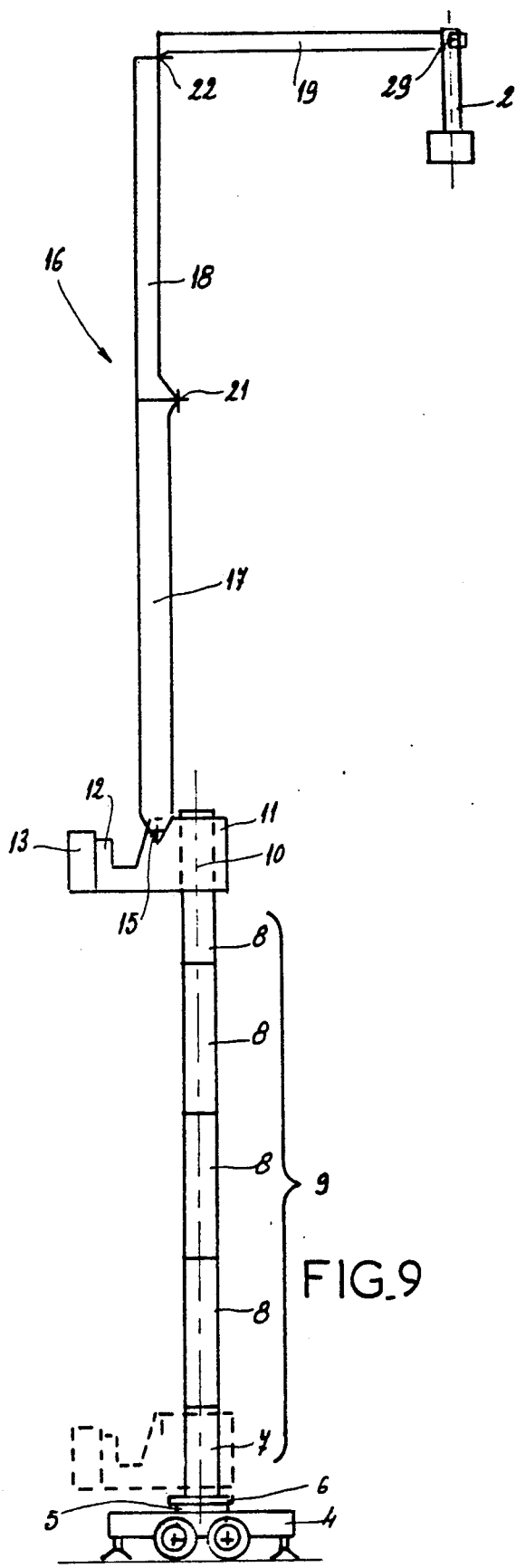

As shown in FIG. 4, the boom is designed to position its own additional pole elements 8 by itself. With slide 10 mounted on base pole 7 of rotating underframe 6, or more generally on pole 9, the boom will grasp an additional pole element 8 placed in front of carrier 1 through the intermediary of its arm 16 endowed with compensator arm 2 or otherwise, and place it at the top of pole 9 already in place. Hinge axis 15 of arm 16 on slide 10 is positioned, with offsetting towards the rear with respect to the vertical rotation axis of pole 9, so that additional pole elements 8 can be positioned when primary arm 17 is in substantially vertical position.

Figure 13:
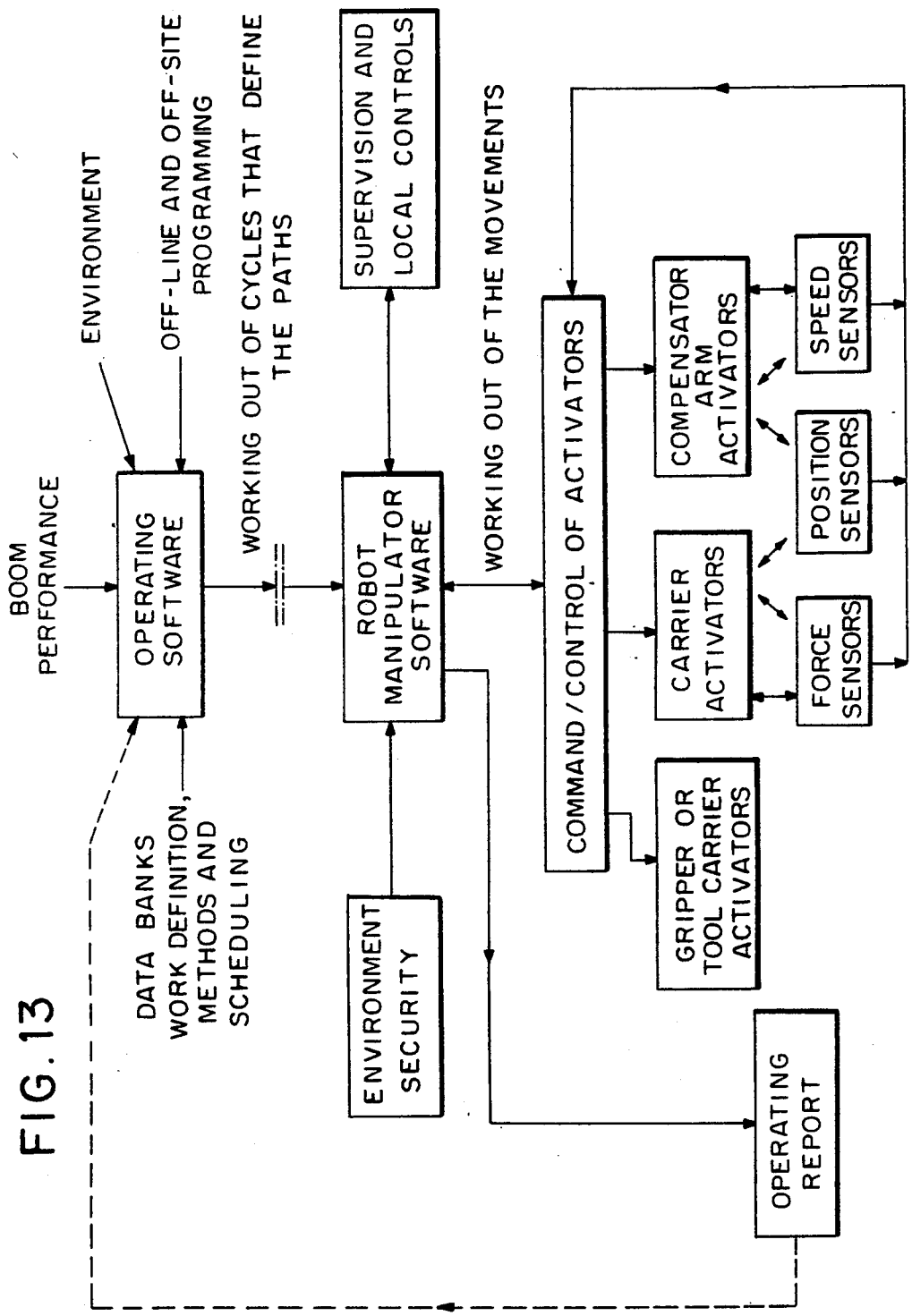
FIG. 13 is a general block diagram of the operation of the automated transportable construction boom.

The overall operation of the boom is illustrated by the block diagram in FIG. 13, with the lower part indicating the following in blocks:
activators of carrier 1, compensator arm 2 and gripper 3 or tool carrier (depending on the use of the boom);
the means to adjust and control the various activators
the position and speed sensors as well as the stress sensors associated with said activators.

For its operation, especially in automatic mode, the boom is loaded with software serving primarily to process movements for the control of each activator. Said software connects with local controls and supervision, as well as with safety and environmental perception elements.

Operation of the boom in automatic mode itself is subjected to off-line programming prepared off site and establishing systems programs as indicated at the top of FIG. 13.

Finally, the boom registers the characteristics of the operations performed (operating report); said information must be retrieved in order to update the data bases used for off-line programming prepared off site-see the return looping indicated in dotted lines.

Of course, the invention is not limited only to the embodiment of this large, high-capacity boom for use in open areas as described above as an example; on the contrary, it encompasses all variations following the same principle, regardless of the construction details and regardless of the particular applications in the fields of construction and public works and other activities that may be assimilated therewith; said applications are not limited to load manipulation, but also include demolition and renovation work with the use of the appropriate tools.

What is claimed is:

1. A large, high-capacity automated transportable construction boom designed for use in open areas, said boom comprising:
an underframe (4) having thereon an elastically-deformable slender structure, composed essentially of a modular base pole (7) having a substantially vertical rotation axis and an arm (16) hinged to a top of said modular base pole (7) around a substantially horizontal hinge axis (15),
first means (5) on said underframe for rotating said modular base pole (7) around said vertical rotation axis,
second means (26) on said modular base pole and said arm for rotating said arm (16) around said hinge axis (15),
said arm being made of several elements (17, 18, 19) hinged to each other around axes (21, 22) parallel to said substantially horizontal axis (15),
said arm (16) being foldable and unfoldable in a vertical plane passing through said vertical rotation axis of said base pole (7);
third means (27, 28) on said several elements for rotating said several elements around said parallel axes,
a first end of a compensator arm (2) rotatably connected by a first link (29) to a free end of said arm (16),
said first link having fourth means (30, 31) for rotating said compensator arm (2) relative to said arm (16),
said compensator arm (2) having a lowinertia structure relative to said arm (16), a gripper carrier (36) having stress sensor means (46) for detecting impacts with objects to be loaded to said gripper carrier (36), said gripper carrier (36) connected by a second link (35) at a second end of said compensator arm (2), telescopic and orientation means (32) on said compensator arm (2) for moving said gripper carrier with respect to objects to be loaded to said gripper carrier, said first link (29) and said second link (35) providing said compensator arm (2) and said gripper carrier (36) with at least one degree of redundant movement, means for separately adjusting and controlling said first means, said second means, said third means, said fourth means and said telescopic and orientation means; and a load gripper (3) engaged on said gripper carrier (36) having means for engaging loads, wherein said underframe (4) has wheels and outriggers (50) to support said wheels (25) above the ground, said first means comprising a motorized orientation device (5) and a rotating underframe (6) mounted above said underframe (4), said rotating underframe (6) equipped with said modular base pole (7) that can accommodate additional pole elements (8) to form an extended pole (9), a slide (10) mounted to vertically slide on said extended pole (9), said slide (10) composed of a telescopable cage (11) surrounding said extended pole (9) and a support (12) having a compensating ballast (13) placed at its rear, said slide (10) holding in its rear part (14) said horizontal hinge axis (15) of said arm (16), said compensatory ballast (13) being rotatable with said slide (10) and said modular base pole (7).

2. An automated transportable construction boom according to claim 1, wherein said arm (16) is composed of a primary arm (17) having a rear part (2) which is portico-shaped to hinge (15) on both sides of said slide (10), a secondary arm 918) hinged (21) to a front end of said primary arm (17) and a tertiary arm (19) hinged (22) to a front end of said secondary arm (18), said tertiary arm (19) holding at a front end said first link (29).

3. An automated transportable construction boom according to claim 1, wherein said first link (29) between said compensator arm (2) and said free end of arm (16) is a cardan joint and said fourth means comprises a first motorized axis (30) parallel to said substantially horizontal hinge axis (15) of said arm (16) allowing an angular spring movement of said compensator arm (2) in a substantially vertical plane containing said vertical rotation axis of said modular base pole (7) and a second motorized axis (31) perpendicular to said first motorized axis (30) allowing the angular spring movement of said compensator arm (2) in a substantially vertical plane perpendicular to said vertical plane containing said vertical rotation axis.

4. An automated transportable construction boom according to claim 2, wherein said compensator arm (2) comprises a substantially vertical telescopic element (32) having an upper fixed part (33) connected to said front end of said tertiary arm (19) of said arm (16) by said first link (29) and a lower sliding part (34) which guides and holds, through the intermediary of said second link (35) which is a cardan joint, said gripper carrier (36) controlled by three double-action jacks (37) placed regularly in a cone at 120° intervals, connecting said gripper carrier (36) on a periphery of said fixed part (33) of said telescopic element (32) by universal joints or pivots (38, 39).

5. An automated transportable construction boom according to claim 4, wherein said gripper carrier (36) with which compensator arm (2) is endowed is composed of an upper plate (40) accommodating on its upper surface said universal joints or pivots (38) supporting said three double-action jacks (37), a lower plate (41) accommodating on a lower surface a motorized orientation means (42) for adjustable movement of gripper (3), said plates (40, 41) being substantially coaxial and interconnected by a closed symmetrical lattice structure (43) composed of six rocker bars (44) having an adjustable length, with said stress sensor means (46) and linked to said plates (40, 41) by additional universal joints or pivots (47, 48).

6. An automated transportable construction boom according to claim 5, wherein said rocker bars (44) each comprise a double-action jack (45), controlled independently of said three aforementioned double-action jacks (37) that control said gripper carrier (36).

7. An automated transportable construction boom according to claim 2, wherein said hinge (15) of said primary arm (17) on said slide (10) is offset sufficiently towards a rear with respect to said vertical rotation axis of said entendable base pole (7) to allow the positioning of additional pole elements (8) when said primary arm (17) is in a substantially vertical position.

8. An automated transportable construction boom according to claim 2, wherein said tertiary arm (19), is designed to pass between the legs of said portico composed of said rear part (20) of said primary arm (17) when said primary arm (17) is in vertical position to allow self-ballasting of said boom.

9. An automated transportable construction boom according to claim 2, wherein said arm (16) is completely folded up in a spiral in transport position with said elements (17, 18, 19) being substantially parallel to the ground, a free end of said arm in said transport position engaged on a tractor vehicle (24) while a second end of said arm in said transport position is carried by said wheels (25) of a trailer made from said underframe (4) of said automated transportable construction boom.

* * * * *